(12) United States Patent
Porter et al.

(10) Patent No.: US 6,891,942 B1
(45) Date of Patent: May 10, 2005

(54) METHOD AND SYSTEM FOR USING CALLER PREFERENCES TO DIRECT SPECIAL CALL HANDLING

(75) Inventors: Kelvin Porter, Dallas, TX (US); Carol Waller, Allen, TX (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/397,214

(22) Filed: Sep. 16, 1999

(51) Int. Cl.$^7$ .............................................. H04M 3/46
(52) U.S. Cl. ............................ 379/211.02; 379/88.19
(58) Field of Search .................... 379/88.01, 88.04, 379/88.19, 88.2, 88.22, 88.23, 88.24, 127, 142, 201, 210, 211, 212, 215, 142.01, 142.06, 201.01, 201.02, 207.02, 207.11, 207.13, 207.14, 207.15, 211.02, 212.01

(56) References Cited

U.S. PATENT DOCUMENTS

| | | | |
|---|---|---|---|
| 5,027,384 A | | 6/1991 | Morganstein |
| 5,375,161 A | | 12/1994 | Epler et al. |
| 5,442,623 A | | 8/1995 | Wu |
| 5,652,789 A | * | 7/1997 | Miner et al. ................. 379/201 |
| 5,668,853 A | | 9/1997 | Brennan et al. |
| 5,793,858 A | | 8/1998 | Meubus et al. |
| 5,867,562 A | * | 2/1999 | Scherer ....................... 379/88 |
| 5,966,433 A | * | 10/1999 | Courville et al. ........... 379/201 |
| 6,041,114 A | * | 3/2000 | Chestnut ..................... 379/211 |
| 6,088,437 A | * | 7/2000 | Amick ........................ 379/212 |
| 6,154,533 A | * | 11/2000 | Foelker ...................... 379/201 |
| 6,205,135 B1 | * | 3/2001 | Chinni et al. ............... 370/356 |
| 6,301,350 B1 | * | 10/2001 | Henningson et al. .................. 379/211.02 X |
| 6,324,265 B1 | * | 11/2001 | Christie, IV et al. .... 379/88.23 |
| 6,327,354 B1 | * | 12/2001 | Pelletier et al. ..... 379/211.02 X |
| 6,343,121 B1 | * | 1/2002 | Infosino ................ 379/215.01 |
| 6,389,117 B1 | * | 5/2002 | Gross et al. ............. 379/88.23 |

FOREIGN PATENT DOCUMENTS

| | | |
|---|---|---|
| EP | 0859484 | 8/1998 |
| WO | 97/09803 | 3/1997 |
| WO | 98/53591 | 11/1998 |

OTHER PUBLICATIONS

Barbuceanu et al., "Coordination Based on Obligation", System Sciences, 1998, Proceedings of the Thirty–First Hawaii International Conference on Kohala Coast, HI, USA, Jan. 6–9, 1998, Los Alamitos, CA USA, IEEE Computer Society, pp. 14–23.

Shiragaki et al., "Optical Digital Cross–Connect System Using Photonic Switch Matricesand Optical Amplifiers", Electronics & Communication in Japan, Part I—Communications, Scripta Technica, New York, US, vol. 78, No. 6, Jun. 1, 1995, pp. 93–101.

Wuttisittikulkij et al., "Multiwavelength Self–Healing Ring Transparent Networks", Global Telecommunications Conference, 1995, Conference Record, Communication Theory Mini–Conference, Globecom 1995, IEEE Singapore, Nov. 13–17, 1995, New York, NY, US, IEEE US, Nov. 13, 1995, pp. 45–49.

* cited by examiner

*Primary Examiner*—Scott L. Weaver

(57) ABSTRACT

A caller may establish preferences regarding special call handling of a call to a called. The caller may be notified when a special call handling option is about to be performed. The called may have the option of skipping the call handling option or aborting the call. In another alternative, the preferences of the caller are obtained and stored prior to the placement of the call. These preferences are then used to guide special call handling during the course of the call. In this fashion, the caller need not be a passive party relative to special call handling but may provide input so as to help guide special call handling.

22 Claims, 4 Drawing Sheets

US 6,891,942 B1

METHOD AND SYSTEM FOR USING CALLER PREFERENCES TO DIRECT SPECIAL CALL HANDLING

BACKGROUND

The present invention relates generally to telecommunication systems and, more particularly, to a method and system for using caller preferences to direct special call handling.

With conventional call handling, a caller initiates a telephone call to a callee (also refered to as a called by those skilled in the art of telephony; hereinafter "called") and the called's phone rings if the called's phone is on-hook. The called's phone rings until either the phone is answered or the caller hangs up (i.e. goes on-hook). If the called is currently on another telephone call, the caller receives a busy signal.

Conventional telephone systems, however, also provide special call handling for calls directed to a called. The special call handling differs from the conventional call handling. For example, after a designated number of rings, the call may be directed to a voice mail system or an answering machine. The direction of the call to the voice mail system or answering machine is an example of special call handling. The called may also configure call handling so that calls directed to the called's phone are forwarded to another telephone number. Such call forwarding is another example of special call handling. "Find me" services are yet another example of special call handling. Such services ring a succession of different phones until the called is located or until the phone call is directed to a voice mail platform or other intelligent servicing platform. A called may configure the "find me" service, for example, so that the call initially rings at a called's office and after a designated number of rings at the called's home. If there is no answer after a designated number of rings at the called's home, the cellular phone of the called is rung. Finally, if this called does not answer the cellular phone after a designated number of rings, the call is directed to a voice mail system.

Special call handling may also entail the direction of calls to a paging system such that a numerical or textual page is generated to the called. Still further, calls may be directed to intelligent service platforms that cause the generation of electronic mail, video mail, or facsimile messages.

Unfortunately, one of the drawbacks of special call handling in conventional systems is that the caller has no control over the special call handling options. The special call handling options are automatically performed. The caller may not wish to have the call handled in accordance with the special call handling options.

SUMMARY

The present invention addresses the above-described limitations of conventional systems relative to special call handling. In one embodiment, a caller is advised that a special call handling option is about to be performed, which was a default setting established by the called or the equipment. In this situation the caller has the option of moving sequentially through the special call handling sequence established by the called or skipping around within the established sequence. The caller may have the option of skipping the option or aborting the call. The caller may be prompted to provide a spoken response or to provide a dual tone multi-frequency (DTMF) input to state the preference of the caller relative to the option. In this fashion, the caller is able to provide added control of the call relative to special call handling options.

In another embodiment, the preferences of the caller are stored in the storage and are accessed at the time of placing the call to the called so as to direct special call handling according.

In accordance with another embodiment, prior to placing a call, the preferences of a caller regarding special call handling are identified. The call is placed from the caller to a called, and the special call handling is performed on the call in accordance with the identified caller's preferences.

In accordance with yet another embodiment, a system for providing interactive call handling includes a special call handling unit for providing special call handling for a call from a caller to a called as configured for the called. A caller preference identifier identifies the caller's preferences regarding special call handling of a call and conveys the caller's preferences so as to affect the special call handling of the call.

DETAILED DESCRIPTION

Disclosed is an approach to facilitate interactive feedback from a caller regarding preferences for special call handling of a call. In a first embodiment, the caller is notified when a call from the caller to a called is to be subject to special call handling. For example, the caller may be advised that the call is about to be redirected to voice mail by presenting an audio message to the caller. The caller may then be given the option of aborting the call or skipping the special call handling option. Thus, for example, the caller may be presented with a voice message that asks the caller to decide whether the caller wishes to skip voice mail or terminate the call. The caller may be prompted to push a button on a push button phone to select the option or may be prompted to provide spoken input that is recognized by speech recognition technology. In this first alternative, the input provided by the caller is recognized and is used to guide the special call handling of the call. Suppose that the caller opts to skip voice mail. In such an instance, the next special call handling option may become the current call handling option (i.e. the active call handling option). The caller may then be notified of the new call handling option and prompted for input.

In a second embodiment, the caller does not directly provide interactive feedback. Instead, caller preferences regarding special call handling are gathered prior to placing a call and stored in a storage. When the caller places a call, these preferences are accessed to guide any special call handling. The caller preferences are automatically taken into account without requiring the caller to provide interactive feedback.

Figure 1:
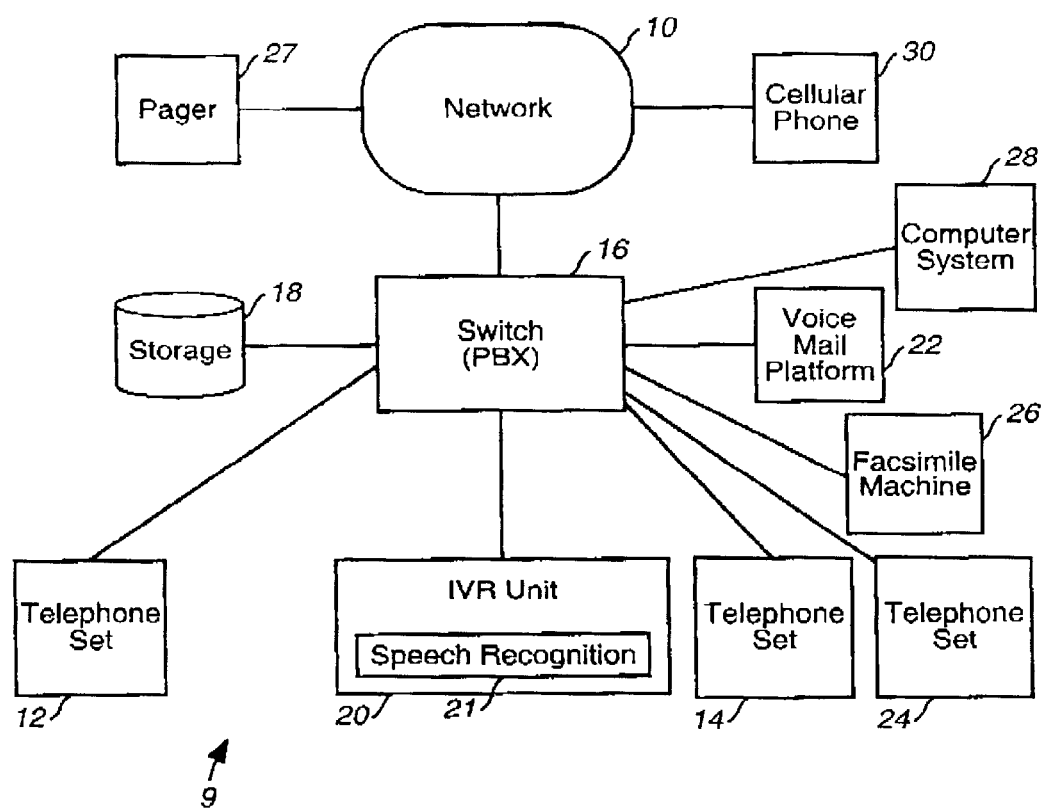
FIG. 1 depicts a telecommunications network in accordance with the teaching.

FIG. 1 depicts a telecommunications network 9 that includes a network 10 to which a switch 16 is interfaced. The network 10 may include a public switch telephone network (PSTN), computer network or other variety of network. One or more voice trunks may interface the switch 16 with the network 10. The switch 16 may be any of a number of different types of switching devices that are commercially available. For purposes of the discussion below, it is presumed that the switch is a private branch exchange (PBX). Those skilled in the art will appreciate that the present invention may be practiced in environments where the switch 16 is not a PBX.

The switch 16 receives calls from the network 10 and forwards calls out to the network 10. In addition, the switch 16 directs internal calls between telephone sets 12, 14 and 24. The switch 16 includes a storage 18 that holds information to guide direction of calls. As will be explained in more detail below, the storage 18 holds information regarding call handling for a caller and may hold additional information as well. The switch 16 is interfaced with an interactive voice response (IVR) unit 20. The IVR unit 20 provides interactive voice response support. The IVR unit 20 is able to generate voice messages, receive spoken input and DTMF input. The IVR unit 20 may be programmed to perform certain application scripts that guide the voice messages and that are output to a caller and guide the collection of input. The IVR unit 20 may include speech recognition technology 21 for recognizing particular spoken input. The switch 16 may also be interfaced with a computer system 28 and a voice mail platform 22. The voice mail platform 22 may have separate voice mail boxes for the respective parties. The facsimile machine 26 may be connected to the switch 16.

Those skilled in the art will appreciate that the depiction of the network 9 in FIG. 1 is intended to be merely illustrative and not limiting of the present invention. The present invention may also be practiced with other telecommunication network configurations. In such alternative configurations different components than those shown in FIG. 1 may be included. Moreover, the switch 16 may not be part of a telephone network but rather may be part of a computer network or a hybrid network that contains both telecommunications and computing components.

Figure 2:
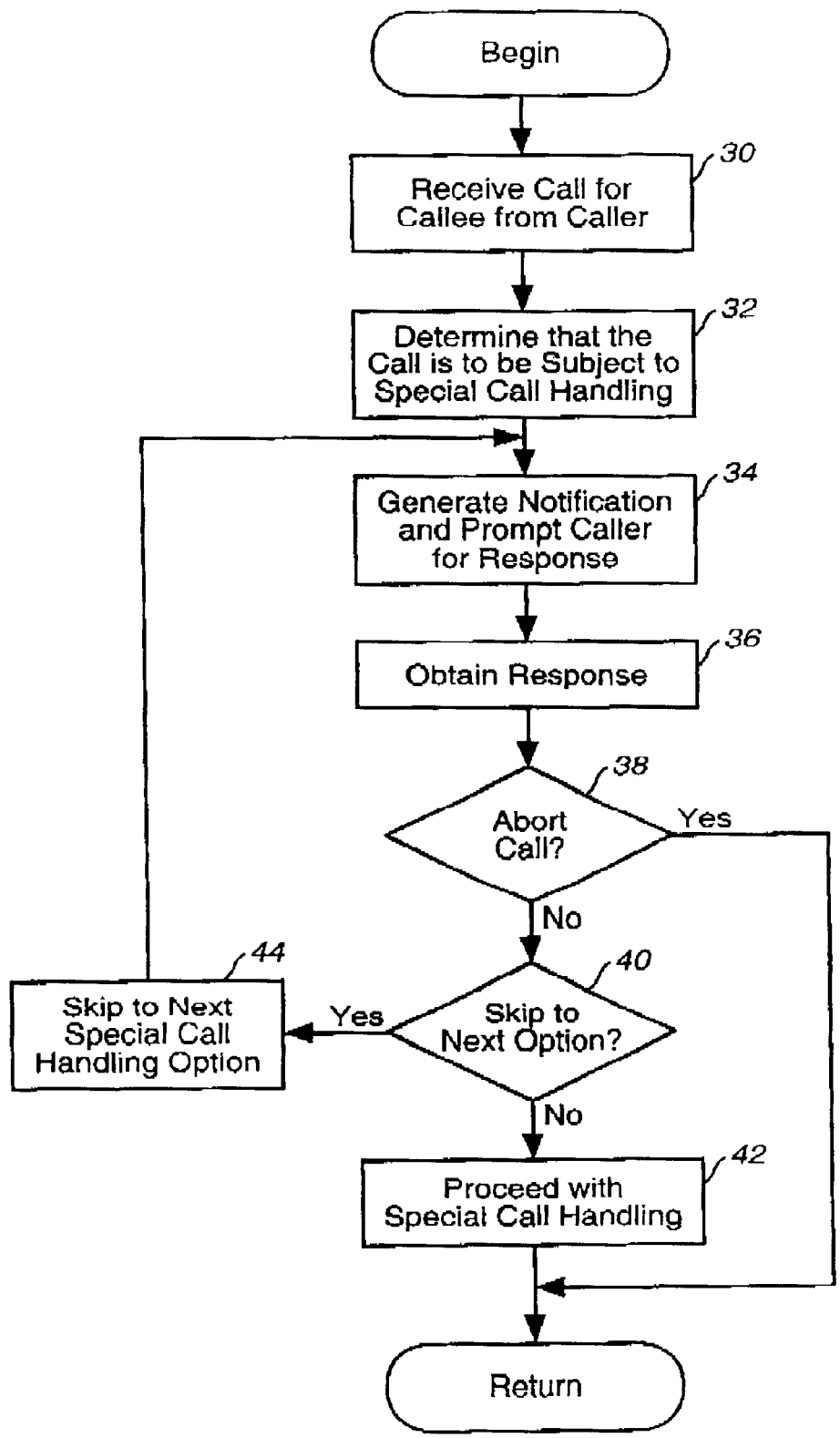
FIG. 2 is a flow chart illustrating the steps that are performed in a first alternative of the illustrative embodiment.

Referring now to FIG. 2, at step 30, initially the switch 16 receives a call from a caller. For purposes of illustration, suppose that a caller initiates a call from telephone set 12, in FIG. 1. The call is initially destined for the called at telephone set 14. The called, however, has a call handling plan that designates special call handling of the call. Special call handling in the present context refers to call handling that differs from conventional call handling. Special call handling may entail redirection to alternative destinations as well as customized behavior, such as the interruption of calls, the generation of special messages to the called and the like.

Figure 3:
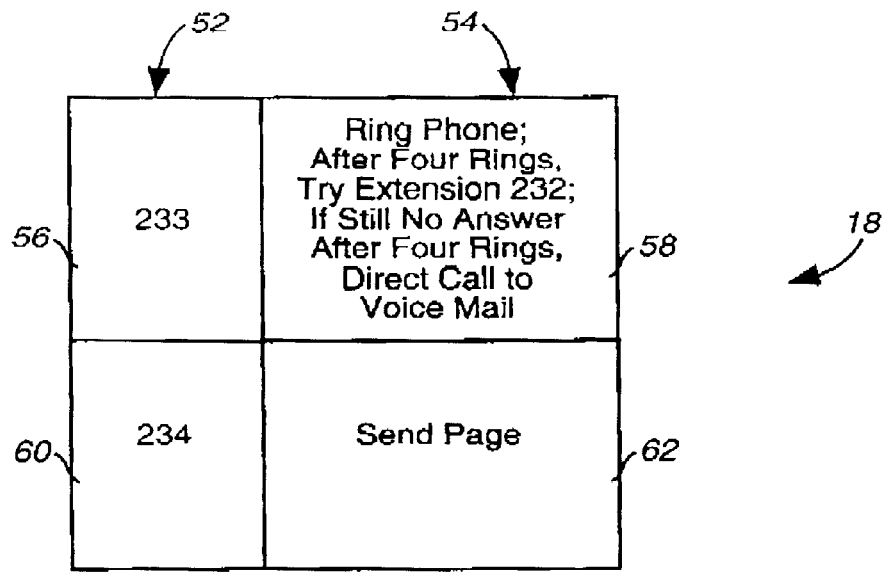
FIG. 3 depicts the format of data held in storage for specifying special call handling options.

At step 32, it is determined that the call is to be subject to special call handling at the switch 16. While the switch 16 receives the call from telephone set 12, the switch accesses the storage 18 to determine how the call should be handled. As shown in FIG. 3, the storage 18 may hold special call handling options 54 for the called. In the example depicted in FIG. 3, each phone number 52 may have the associated special call handling options 54 for each extension 56 and 60, such as extension 56 designated by the number 233, the special call handling options 58 are configured as a sequence in accordance with a call handling plan. Initially, the phone is rung. If the phone has not been answered after a set number of rings, such as four rings, the call is redirected to extension 232. If there is still no answer, the call is directed to voice mail.

It should be appreciated that different phone numbers may have different special call handling options. For example, for extension 60 designate by the number 234, all calls result in the generation of a page that is sent to a pager 27 for the caller as shown by a special call handling option 62. The call handling plan may include forwarding options that direct the call to alternative destinations, as mentioned above. The call handling options may also request custom behavior that otherwise would not be performed during conventional call handling.

At step 34, a notification is generated and sent to the caller and the caller may be prompted for a response. This prompt may be via an audio message generated by the IVR unit 20. This notification advises the caller that a special call handling option is about to be performed. Considering the case where the caller is calling extension 56 designated as 233 for the example depicted in FIG. 3, the phone is initially rung and after four rings, the caller is notified that the call is about to be redirected to extension 232. The notification may be generated by the IVR unit 20. For example, the IVR unit 20 may present an audio message to a caller advising the caller that the call is about to be redirected to extension 232.

The caller may be prompted to provide DTMF input. For example, an audio message may advises the caller to press a first push button key to abort the call or a second push button key to skip a special call handling option. The caller may be prompted to push a third push button key to accept the special call handling option. Alternatively, the special call handling option may be automatically performed if the caller does not provide a negative response within a selected period of time.

Those skilled in the art will appreciate that the notification need not be purely an audio message. For example, a facsimile may be sent to the facsimile machine 26 in FIG. 1, an electronic mail message may be sent to a computer system 28 or a video mail message may be sent to the computer system 28. Still further, a page may be sent to the pager 27. In a similar fashion, the response from the caller need not be purely via telephone but rather may be via computer system 28, via facsimile 26, or two-way pager 27.

Continuing with FIG. 2, at step 36, a response is obtained from the caller. The response may constitute, in some instances, no affirmative action by the caller. At steps 38 and 40, based on this response, the switch 16 determines whether to abort the call or whether to skip to the next special call handling option, respectively. If the next special call handling option is not skipped, then at step 42, special call handling proceeds in accordance with the call handling plan configured for the called. On the other hand, if the response is to skip the next special call handling option, then at step 44, the next special call handling option is skipped and the next sequential special call handling option becomes the current call handling option. Those skilled in the art will appreciate that when all of the special call handling options have been exhausted, the process may repeat at the beginning of the sequence of special call handling options or may simply no longer present the caller with the option to skip the special call handling options.

Figure 4:
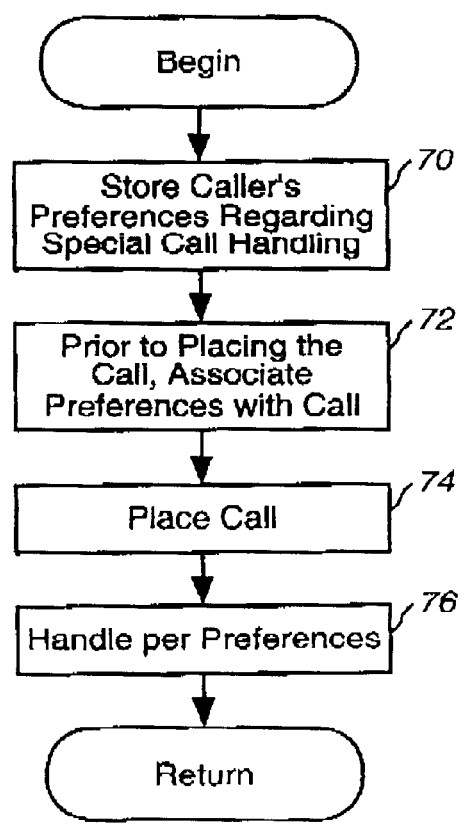
FIG. 4 is a flow chart illustrating the steps that are performed in a second alternative of the illustrative embodiment.

Referring now to FIG. 4, at step 70, a caller's preferences regarding special call handling are stored in the storage 18 of FIG. 1. In this alternative, the storage 18 may hold the database identifying a caller's preferences regarding special call handling. At step 72, prior to placing the call, the preferences are associated with the call. In particular, the switch 16 may access the storage 18 and access the records or other data structures stored therein to hold the caller's preferences regarding special call handling. The caller preferences may be indexed by customer name, as discussed with respect to FIG. 5A.

Figure 5A:
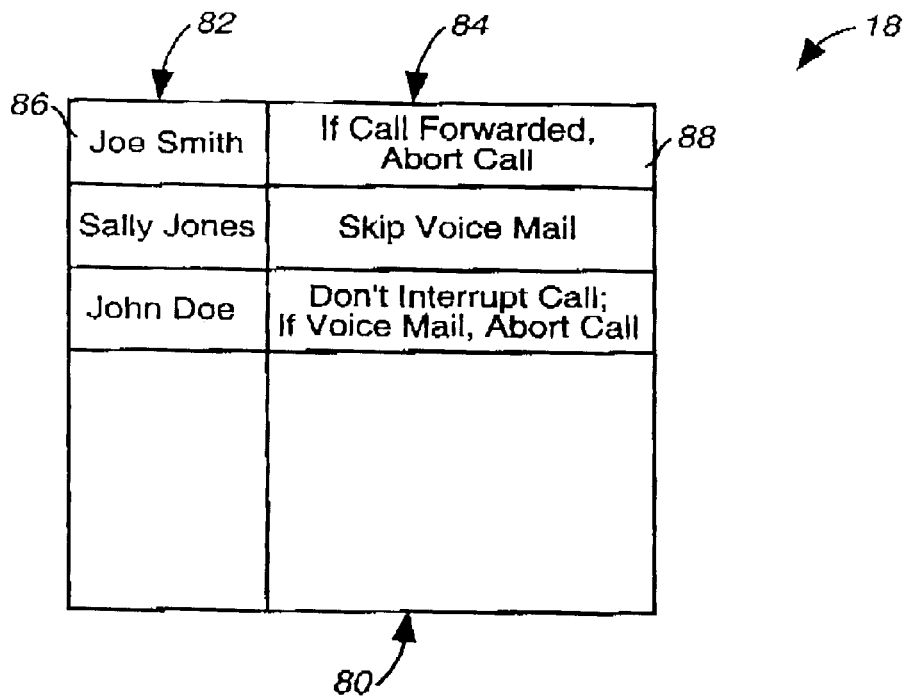
FIG. 5A depicts an instance wherein caller preference records are indexed by customer name.

Referring now to FIG. 5A, the storage 18 contains a database 80 of caller preferences including a customer name set 82 and corresponding preferences 84. For example, a customer name 86 is identified as "Joe Smith" with preference 88, which is to abort the call if the call is forwarded. These preferences may be actively associated with particular calleds or may be applicable to all calls generated by the caller.

Figure 5B:
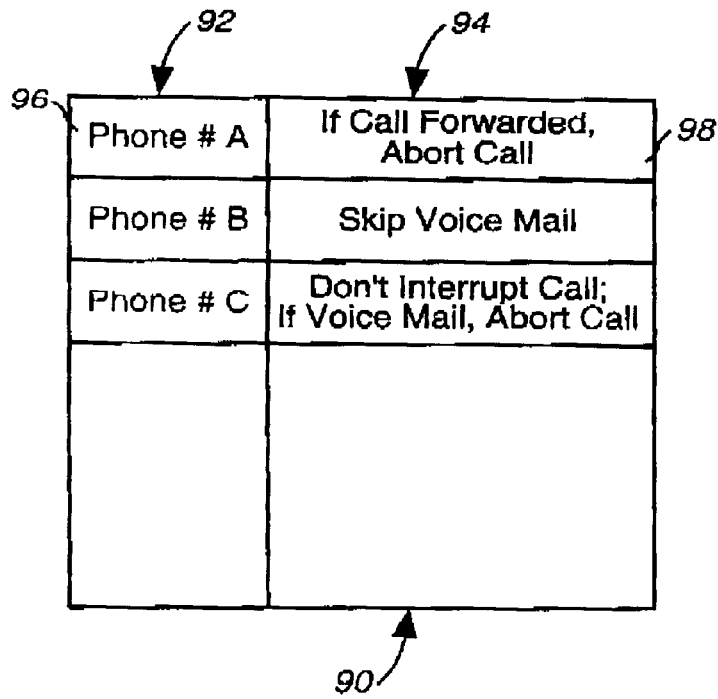
FIG. 5B depicts an example where caller preference records are indexed by phone number.

Referring now to FIG. 5B, the storage 18 contains preferences held in a database 90 where the preferences 94 are indexed by corresponding phone number indexes 92. In the first example, a preference 98 that is aborting the call if the call is forwarded. This is associated with an index position 96 containing a phone number "A" rather than a customer name. Those skilled in the art will appreciate that the caller preferences may be associated with a number of different types of index fields and that the fields depicted in FIGS. 5A and 5B are intended to be merely illustrative.

At step 74, the call is placed. At step 76, the call is handled by the switch 16 in accordance with the caller preferences.

In the illustrative embodiment, the switch 16 acts as a special call handling unit for providing special call handling for calls according to call handling plans configured for. calleds. The switch 16 and the IVR unit 20 act as a call preference identifier for identifying the caller's preferences and conveying the information to affect the special call handling of the call.

While the present invention has been described with reference to an illustrative embodiment thereof, those skilled in the art will appreciate that various changes in form and detail may be made without departing from the intended scope of the present invention as defined in the appended claims.

What is claimed is:

1. In a telecommunications network, a method comprising the steps of:

storing preferences established by a caller regarding special call handling;

receiving a call from the caller to a called;

determining that the call is subject to a special call handling plan, the special call handling plan including re-directing the call to an alternate destination based on the stored preferences established by the caller and including forwarding options that are attempted in sequence until the call is answered;

providing the caller with a notification that the call is to be subject to special call handling and that the call is to be sent to voice mail;

prompting the caller for input; and handling the call in accordance with the input provided by the caller.

2. The method of claim 1, further comprising:

asking the caller if the caller wishes to abort the call.

3. The method of claim 1, wherein the input from the caller is DTMF input.

4. The method of claim 1, wherein the receiving of the call is performed by a switching device.

5. The method of claim 1, wherein the step of providing comprises notifying the caller that the call is to be forwarded.

6. The method of claim 1, further comprising:

notifying the caller that the call is on second call and that the second call is going to be interrupted.

7. In a telecommunications network, a method comprising the steps of:

storing preferences established by a caller regarding special call handling;

receiving a call from the caller to a called:

determining that the call is subject to a special call handling plan, the special call handling plan including re-directing the call to an alternate destination based on the stored preferences established by the caller and specifying forwarding options that are attempted in sequence until the call is answered;

providing the caller with a notification that the call is to be subject to special call handling; prompting the caller for input including asking the caller if the caller wishes to skip one of the forwarding options; and handling the call in accordance with the input provided by the caller.

8. In a telecommunications network, a method comprising the steps of:

storing preferences established by a caller regarding special call handling;

receiving a call from the caller to a called;

determining that the call is subject to a special call handling plan, the special call handling plan including re-directing the call to an alternate destination based on the stored preferences established by the caller;

providing the caller with a notification that the call is to be subject to special call handling and that the call is to be sent to a voice mail;

prompting the caller for input, wherein the input from the caller is spoken input; and handling the call in accordance with the input provided by the caller.

9. In telecommunications network, a method comprising the steps of:

storing preferences established by a caller regarding special call handling prior to receiving a call from the caller to a called wherein the preferences include skipping a special call handling option in favor of another special call handling option and forwarding options that are attempted in sequence until the call is answered;

performing special call handling on the call in accordance with the stored preferences established by the caller; and identifying the stored preferences as the caller's preferences regarding special call handling of the call.

10. In a telecommunications network, a method comprising the steps of:

storing preferences established by a caller regarding special call handling prior to receiving a call from the caller to a called;

performing special call handling on the call in accordance with the stored preferences established by the caller;

associating special call handling preferences with a phone number, the special call handling preferences including forwarding options that are attempted in sequence until the call is answered;

determining a phone number of a phone where the call originated; and identifying the stored preferences as the caller's preferences regarding special call handling of the call based on the determined phone number from where the call originated.

11. In a telecommunications network, a method comprising the steps of:

storing preferences established by a caller regarding special call handling prior to receiving a call from the caller to a called, the preferences including aborting the call before a selected special call handling option takes place and including forwarding options that are attempted in sequence until the call is answered;

performing special call handling on the call in accordance with the stored preferences established by the caller; and identifying the stored preferences as the caller's preferences regarding special call handling of the call.

12. A system for providing interactive call handling, comprising:

a special call handling unit for providing special call handling for a call from a caller to a called as configured for the called;

a caller preference identifier coupled to the handling unit for identifying the caller's preferences regarding special call handling of the call and for conveying the caller's preferences so as to affect the special call handling of the call, wherein the call preference identifier includes a notification generator coupled to the handling unit for generating a notification to the caller that a special call handling option is to be performed on the call prior to the special call handling option being performed; and a storage for storing the caller's preferences regarding the special call handling of the call and wherein the call preference identifier accesses the storage to identify the caller's preferences regarding special call handling of the call, wherein the special handling includes attempting forwarding options in sequence until the call is answered.

13. The system of claim 12, wherein the caller preference identifier interactively obtains the caller's preferences regarding special call handling of the call.

14. The system of claim 12, wherein the handling unit provides voice mail as a type of special call handling.

15. The system of claim 12, wherein the handling unit provides call forwarding as a type of special call handling.

16. In a telecommunications network, a method comprising the steps of:

storing preferences established by a caller;

receiving a call from the caller to a called;

determining that the call is to be subject to a call handling plan, the call handling plan being associated with the preferences and including forwarding options that are attempted in sequence until the call is answered;

handling the call in accordance with the call handling plan and based on the stored preferences established by the caller; and notifying the caller that the call is to be sent to voice mail.

17. The method of claim 16, wherein the call handling plan comprises redirecting the call to an alternative destination.

18. The method of claim 16, wherein the receiving the call is performed by a switching device.

19. The method of claim 16, wherein the step of providing comprises notifying the caller that the call is to be forwarded.

20. In a telecommunications network, a method comprising the steps of:

storing preferences established by a caller;

receiving a call from the caller to a called;

determining that the call is to be subject to a call handling plan, the call handling plan being associated with the preferences and including forwarding options that are attempted in sequence until the call is answered, and wherein the call handling plan includes the option to skip one of the forwarding option; and handling the call in accordance with the call handling plan and based on the stored preferences established by the caller.

21. In a telecommunications network, a method comprising the steps of:

storing preferences established by a caller;

receiving a call from the caller to a called;

determining that the call is to be subject to a call handling plan, the call handling plan being associated with the preferences;

handling the call in accordance with the call handling plan and based on the stored preferences established by the caller in response to a spoken input from the caller; and notifying the caller that the call is to be sent to voice mail.

22. A method of providing special call handling of a call placed by a caller to a called, the method comprising:

determining whether the call is subject to special call handling based on stored preferences established by the caller, the special handling including forwarding options that are attempted in sequence until the call is answered;

notifying the caller that the call is to be subject to special call handling and selectively indicating that the call is forwarded to a voice mail system; and prompting the caller for an input to determine how the call is to be processed.

* * * * *